W. E. CLARK.
MACHINE FOR ERADICATING QUACK GRASS.
APPLICATION FILED JAN. 31, 1920.
1,380,635.
Patented June 7, 1921.
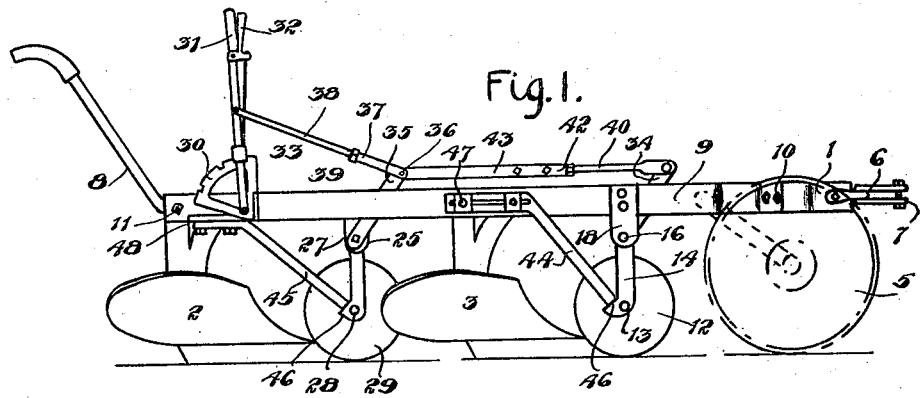
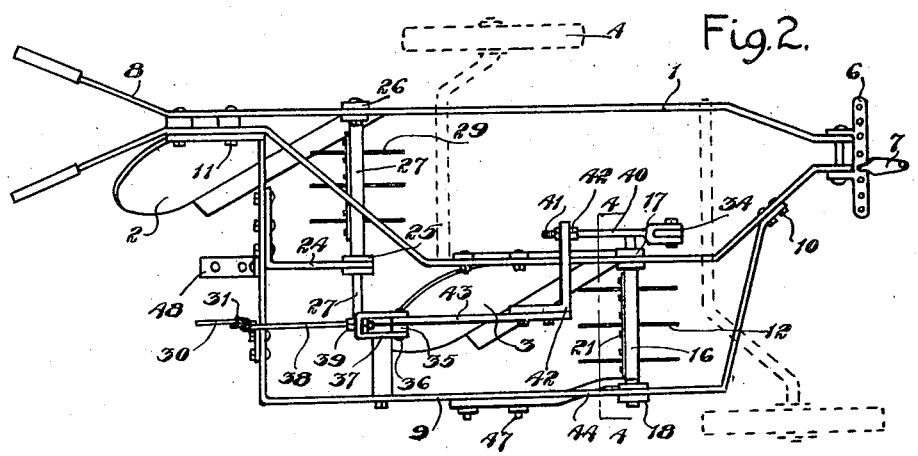
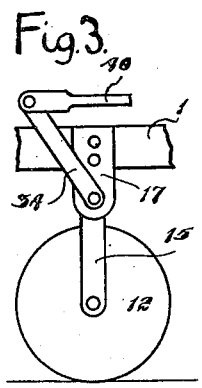
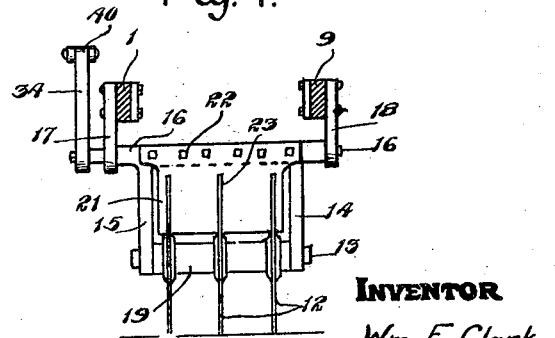
INVENTOR
Wm. E. Clark
BY
ATTYS

UNITED STATES PATENT OFFICE.

WILLIAM EDWARD CLARK, OF BRANDON, MANITOBA, CANADA.

MACHINE FOR ERADICATING QUACK-GRASS.

1,380,635.      Specification of Letters Patent.     Patented June 7, 1921.

Application filed January 31, 1920. Serial No. 355,351.

*To all whom it may concern:*

Be it known that I, WILLIAM EDWARD CLARK, of the city of Brandon, in the Province of Manitoba, Canada, have invented new and useful Improvements in Machines for Eradicating Quack-Grass, of which the following is the specification.

The invention relates to improvements in machines for getting out twitch or quack grass and particularly to an attachment for a gang plow, and the principal object of the invention is to provide an attachment which can be attached to the ordinary gang plow, and which can be independently operated and is designed when in action to cut soil into strips directly in front of the plows and thereby render it easy to kill the undesirable weed growth in the field.

A further object is to arrange the attachment so that it can be raised or lowered independently of the plows, thereby making it possible to use the device whenever a patch of weeds such as twitch or quack grass is encountered.

A further object is to construct the device in a manner so that it can be readily attached to existing types of gang plows and so that it can be easily operated by the plowman.

With the above more important objects in view the invention consists essentially in an extension frame secured to the gang plow on the furrow side, sets of cutting disks carried by the latter frame and the plow frame and located in advance of the plows and means for simultaneously raising or lowering the disks, the parts being arranged and constructed as hereinafter more particularly described and later pointed out in the appended claims, reference being had to the accompanying drawing in which:—

Figure 1 is a side view of my attachment as it appears on a gang plow and with the cutting disks in their down position.

Fig. 2 is a plan view.

Fig. 3 is an enlarged detailed side view of the operating lever and the front disks.

Fig. 4 is a sectional view at 4—4' of Fig. 2 and looking forwardly.

In the drawing like characters of reference indicate corresponding parts in the several figures.

As the ordinary gang plow construction is well understood I have not considered it necessary to show and explain all the parts of the plow and in the following description only refer to those parts with which my invention is most closely associated.

1 represents the customary plow frame of a two furrow gang plow and 2 and 3 represent the ordinary plows connected to the frame in the usual manner and location.

4 is the land wheel and 5 the furrow wheel these being adjustable in a manner not shown but well understood by those familiar with the art.

6 is a cross bar at the front of the plow which is fitted with the usual clevis 7.

8 are the handles at the rear end of the plow frame.

In carrying out my invention I secure to the furrow side of the plow frame a side bar 9 which is of the peculiar shape best shown in Fig. 2 and is fastened permanently by the bolts 10 at the front to the plow frame and those 11 to the rear of the plow frame.

The side bar forms with the plow frame what might be termed an extension or side frame.

In a location in advance of the plow 3 I locate a front set of cutting disks 12 which are rotatably mounted on a cross shaft 13 carried by side arms 14 and 15 extending downwardly from a supporting shaft 16, the ends of which are rotatably mounted in side hangers 17 and 18 permanently bolted to the sides of the extension frame. The cutting disks are suitably spaced by sleeves or spacers 19 placed on the shaft 13 and with each disk I associate a scraper 21 which is in reality a downwardly extending plate, the upper end of which is fastened at 22 permanently to the shaft and the lower end of which is slotted as indicated at 23 to span the disk.

Obviously as the disks are rotated the scrapers will clean the disk faces.

To the rear end of the extension frame I secure permanently an inwardly extending L-shaped bracket 24 and to the inner end of this bracket I fasten permanently by bolting the upper end of a downwardly extending hanger 25 similar to that 18, and to the land wheel sides of the plow frame and in a location directly opposite the hanger 25 I secure permanently the upper end of a second downwardly extending hanger 26 and these latter two hangers carry a cross shaft 27 corresponding to that 16.

The shaft 27 carries side arms identical to those 14 and 15 and the said side arms are fitted with a cross shaft 28 corresponding to that 13, and on the shaft 28, I mount a set of suitably spaced cutting disks 29 similar to those 12. Scrapers are provided for the rear disks.

In order to adjust the sets of disks I have provided the parts now described.

To the back of the extension frame I secure a quadrant 30 with which a controlling lever 31 coöperates, the lever being fitted with the usual hand latch 32 and a detent 33.

To the inner ends of the shafts 16 and 27 I secure upstanding lever arms 34 and 35 and the rear lever arm is connected by means of a pivot pin 36 to a spanner 37, the spanner being in turn connected by a rod 38 to the lever 31.

Adjusting nuts 39 secure the rod to the spanner and allow of the adjustment of the rod in respect to the spanner.

To the upper end of the lever arm 34 I connect pivotedly the forward end of a rod 40 the rear end of which is threaded and provided with adjusting nuts 41 fastening it to an angle bar 42. The angle bar is connected by means of a rearwardly extending connecting bar 43 with the pin 36.

From this arrangement it will be apparent that one can by manipulating the lever 31 effect a simultaneous movement, of the disks, the disks swinging forwardly and rising when the lever is pulled back, and taking the position shown in Fig. 1 which is their working position when the lever is upright.

The adjusting nuts allow of the proper setting of the disks in respect to the lever, it being desirable that the side arms carrying the disks be vertical when the lever is vertical.

In order to brace the disks when in the working position I have secured brace bars 44 and 45 to the extension frame, the forward ends of these bars seating on shoulders 46 provided on the side arms, while the rear ends are adjustably secured by fastening bolts 47 to the extension frame.

Here it will be observed that the front bar is adjustably fastened directly to the bar 9 while the rear side stay is fastened to an angle plate 48 on the rear part of the bar 9.

With this device attached to a plow the farmer can operate the disk lever entirely independent of the plow levers so that when he encounters patches of twitch or quack grass he can lower the disks to cut the land into strips and thereby effect the complete loosening of the soil when it is afterward turned over by the plow. The twitch or quack grass can afterward be easily removed from the soil by a cultivator or harrow.

What I claim as my invention is:—

1. The combination with a gang plow frame and the plows thereof, of a side bar permanently secured to the furrow side of the plow frame and forming with the plow frame an extension frame, a front set of cutting disks carried by the extension frame and located in advance of the front plow, a rear set of cutting disks carried by the extension and plow frames and located in advance of the rear plow, an operating connection between the front and rear sets of disks, and a controlling lever connected to the rear set of disks, for simultaneously raising and lowering both sets of disks through the medium of the connection extending between the latter.

2. The combination with the gang plow frame and the plows thereof, of a side bar secured to the furrow side of the plow frame and forming with the plow frame an extension frame, a forward set of spaced disks carried by the extension frame and located in advance of the front plow, the said disks being mounted to be raised and lowered, a set of rear spaced cutting disks carried by the plow and extension frames and located in advance of the rear plow, said latter disks being mounted to be raised and lowered, an operating connection between the sets of disks designed to effect their simultaneous raising or lowering movement, and an operating lever located at the back of the extension frame and connected with the rear set of disks.

Signed at Brandon, this 26th day of December A. D. 1919.

WILLIAM EDWARD CLARK.

In the presence of—
G. F. FISHER,
E. J. NEONELL.